United States Patent [19]
Davis

[11] Patent Number: 6,061,482
[45] Date of Patent: May 9, 2000

[54] CHANNEL LAYERED OPTICAL CROSS-CONNECT RESTORATION SYSTEM

[75] Inventor: Gary B. Davis, Rowlett, Tex.

[73] Assignee: MCI Communications Corporation, Washington, D.C.

[21] Appl. No.: 08/988,073

[22] Filed: Dec. 10, 1997

[51] Int. Cl.[7] .............................. G02B 6/35; H04J 14/02
[52] U.S. Cl. .............................. 385/17; 385/24; 359/117; 359/124; 359/128
[58] Field of Search ........................ 385/17, 24; 359/117, 359/124, 127, 128

[56] References Cited

U.S. PATENT DOCUMENTS

| | | | |
|---|---|---|---|
| 5,194,977 | 3/1993 | Nishio | 359/128 |
| 5,327,275 | 7/1994 | Yamane et al. | 359/117 |
| 5,586,115 | 12/1996 | Nakano et al. | 359/117 |
| 5,627,925 | 5/1997 | Alferness et al. | 385/17 |
| 5,706,111 | 1/1998 | Morales et al. | 359/128 |
| 5,777,761 | 7/1998 | Fee | 359/117 |
| 5,878,177 | 3/1999 | Karasan et al. | 385/17 |

*Primary Examiner*—John D. Lee
*Assistant Examiner*—Michael J. Stahl

[57] ABSTRACT

An optical telecommunications system node terminates a plurality of optical cable routes. Each of the optical cable routes includes a traffic route and a restoration route. The node includes a plurality of traffic wavelength division multiplexers and a plurality of restoration wavelength division multiplexers. A traffic wavelength division multiplexer is connected to each traffic route and a restoration wavelength division multiplexer is connected to each restoration route. The node includes a plurality of optical cross connect layers. Each optical cross connect layer includes a connection to each of the traffic wavelength division multiplexers and to each of the restoration wavelength division multiplexers.

10 Claims, 3 Drawing Sheets

CHANNEL LAYERED OPTICAL CROSS-CONNECT RESTORATION SYSTEM

FIELD OF THE INVENTION

The present invention relates generally to telecommunications systems and networks, and more particularly to a channel layered optical cross connect system for providing restoration services in a telecommunications network.

DESCRIPTION OF THE PRIOR ART

Modern digital telecommunications systems are built upon a hierarchical network. The networks consists of a plurality of nodes or sites that are interconnected by transmission facilities. Generally, lower bandwidth level demands are multiplexed into higher bandwidth demands. For example, up to twenty-eight 1.544 Mbps DS1 channels can be multiplexed into a single 44.736 Mbps DS3 channel. Similarly, up to twelve DS3 channels can be multiplexed into a single 622.08 Mbps OC12 channel. Finally, up to sixteen OC12 channels can be multiplexed into a single 9.953 Gbps OC192 channel. Since a DS1 channel can carry up to twenty-four telephone conversations, a single OC192 channel can carry over 100,000 telephone conversations.

Recently, the capacity of optical fiber cable systems has been increased by the use of wavelength division multiplexing. In an optical wavelength division multiplexing system, optical signals with several carrier wavelengths are transmitted on the same optical fiber. Each carrier is individually modulated by a separate optical transmitter and carries different information. The individual carriers are multiplexed by a wavelength division multiplexer into a single optical fiber. At the receiving end, a wavelength division multiplexer separates the individual carriers. The individual carriers are received by separate optical receivers.

Wavelength division multiplexing has increased substantially the potential capacity of optical telecommunications systems. The optical band around 1550 nanometers can carry over thirty separate OC192 channels. Thus, with wavelength division multiplexing, a single optical fiber can carry over three million simultaneous telephone conversations. Wavelength division multiplexing gives telephone carriers the ability to increase capacity by adding channels to existing optical fiber cables, rather than by laying additional cable.

Telecommunications systems consist of equipment, which includes transmitters, receivers and switches, and facilities, which include the physical transport medium, i.e. optical fiber cable, and various regeneration and amplification devices. Because of the tremendous volume of calls carried on each channel, it is necessary that service not be interrupted for any significant amount of time in the event of a facility or equipment failure.

Typical telecommunications networks have a mesh topology, in which there are alternative paths through the network between nodes. Accordingly, when there is a facility failure, as for example, when an optical fiber is cut, there is a separate path to which the traffic on the cut fiber can be switched. Today, when a cut occurs, traffic is rerouted at the DS3 level through other sites so that the origin and destination are again connected. Since one OC192 fiber connection includes 192 DS3 electrical connections, tremendous broad band digital cross connect port capacity is required for restoration. Also, switching at the DS3 level is relatively slow.

Recently, there have been proposals to provide restoration services in the optical layer of an optical network. In an optical restoration system, the working routes and the restoration routes are coupled together through a large optical cross connect device. In the event of the failure of a working route, the channels of the failed working route are switched to any of several diversely routed restoration routes.

There are a number of shortcomings associated with the proposed all-optical restoration systems. The optical cross connect of an all-optical restoration system requires separate ports to the working and restoration routes for each channel. Thus, as channels are added to the system, larger cross connect devices are required. Accordingly, the current systems do not accommodate expansion. Additionally, in the event of an optical cross connect failure, the entire restoration system, and potentially the active working systems, are made inoperative.

It is therefore an object of the present invention to provide an all-optical restoration system that overcomes the shortcomings of the prior art.

SUMMARY OF THE INVENTION

In one of its aspects, the present invention provides an optical telecommunications system node for interconnecting a plurality of optical cable routes. Each of the optical cable routes includes a traffic route and a restoration route. The node of the present invention includes a plurality of traffic wavelength division multiplexers and a plurality of restoration wavelength division multiplexers. A traffic wavelength division multiplexer is connected to each traffic route and a restoration wavelength division multiplexer is connected to each restoration route. The node of the present invention includes a plurality of optical cross connect layers. Each optical cross connect layer includes a connection to each of the traffic wavelength division multiplexers and to each of the restoration wavelength division multiplexers.

Each of the optical cross connect layers includes a plurality of optical switch pairs. Each of the optical switch pairs includes a first optical switch and a second optical switch. The first optical switches each include one first port and a plurality of second ports that are selectively connectable to the first port. The first port of each first switch is optically coupled to light terminal equipment associated with a traffic route and one of the second ports of each first switch is optically coupled one of the traffic route wavelength division multiplexers. The second optical switches each include one third port and a plurality of fourth ports that are selectively connectable to the third port. The third port is optically coupled to one of the restoration route wavelength division multiplexers, and each of a first plurality of the fourth ports is optically coupled to a second port of each of the first optical switches of the other optical switch pairs. Each of a second plurality of the fourth ports of each of the second optical switches is connected to one of the fourth ports of one of the second optical switches of each of the other optical switch pairs.

DESCRIPTION OF THE PREFERRED EMBODIMENT

Figure 1:
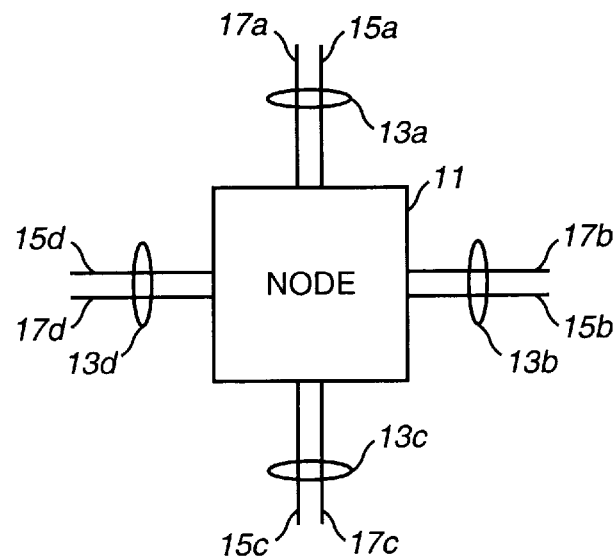
FIG. 1 is a block diagram of a typical telecommunications network node.

Referring now to the drawings, and first in FIG. 1, a network node is designated by the numeral 11. Node 11 is part of the network (not shown) that includes a plurality of nodes. Node 11 terminates four optical cable routes 13. A network node may terminate as few as one optical cable route and as many as six optical cable routes. Each optical route includes at least one working or traffic route 15 and at least one restoration route 17.

Traffic is normally routed along traffic routes 15. As will be explained in detail hereinafter, node 11 includes light terminal equipment, which includes an optical transmitter and an optical receiver, for each optical channel and each cable route. In the event of a failure of one of the traffic routes, node 11 switches the traffic carried by the failure working route to one of the restoration routes. For example, if cable route 13a is cut, thereby cutting both traffic route 15a and restoration route 17a, node 11 will switch the traffic normally carried by traffic route 15a to one of restoration routes 17b–d.

Figure 2:
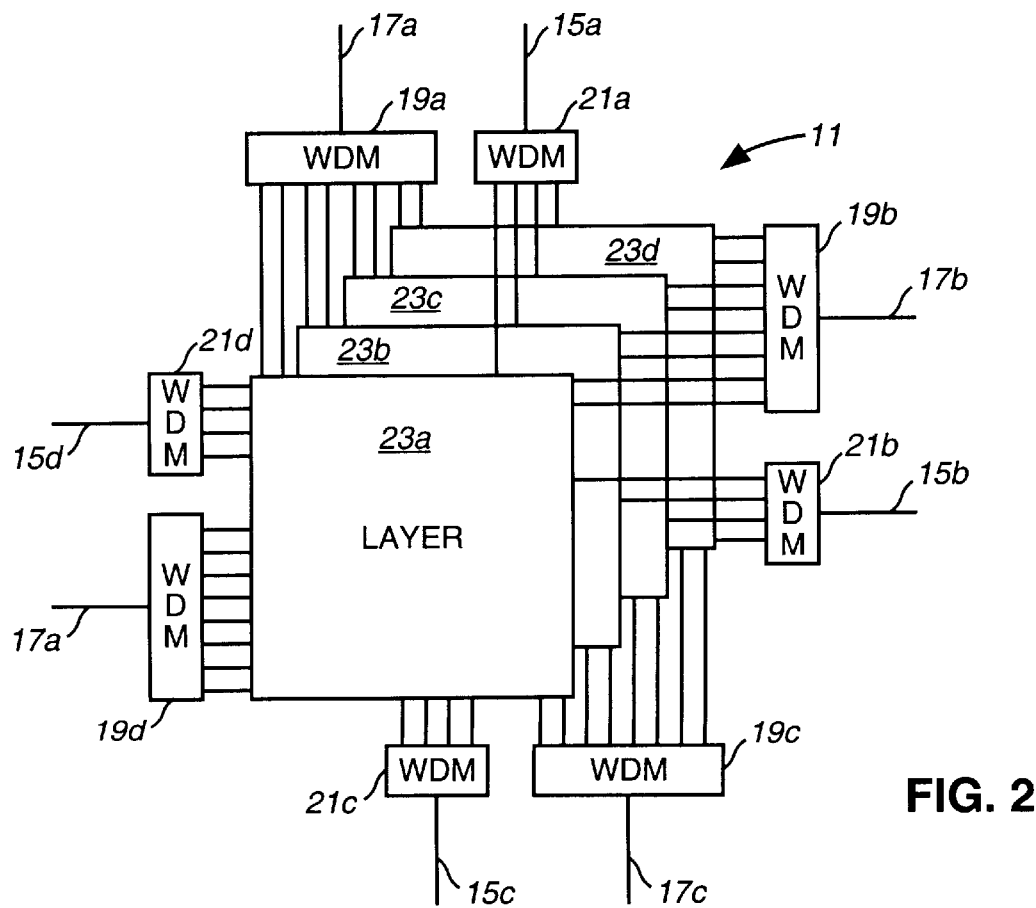
FIG. 2 is a block diagram illustrating channel layering according to the present invention.
Figure 3:
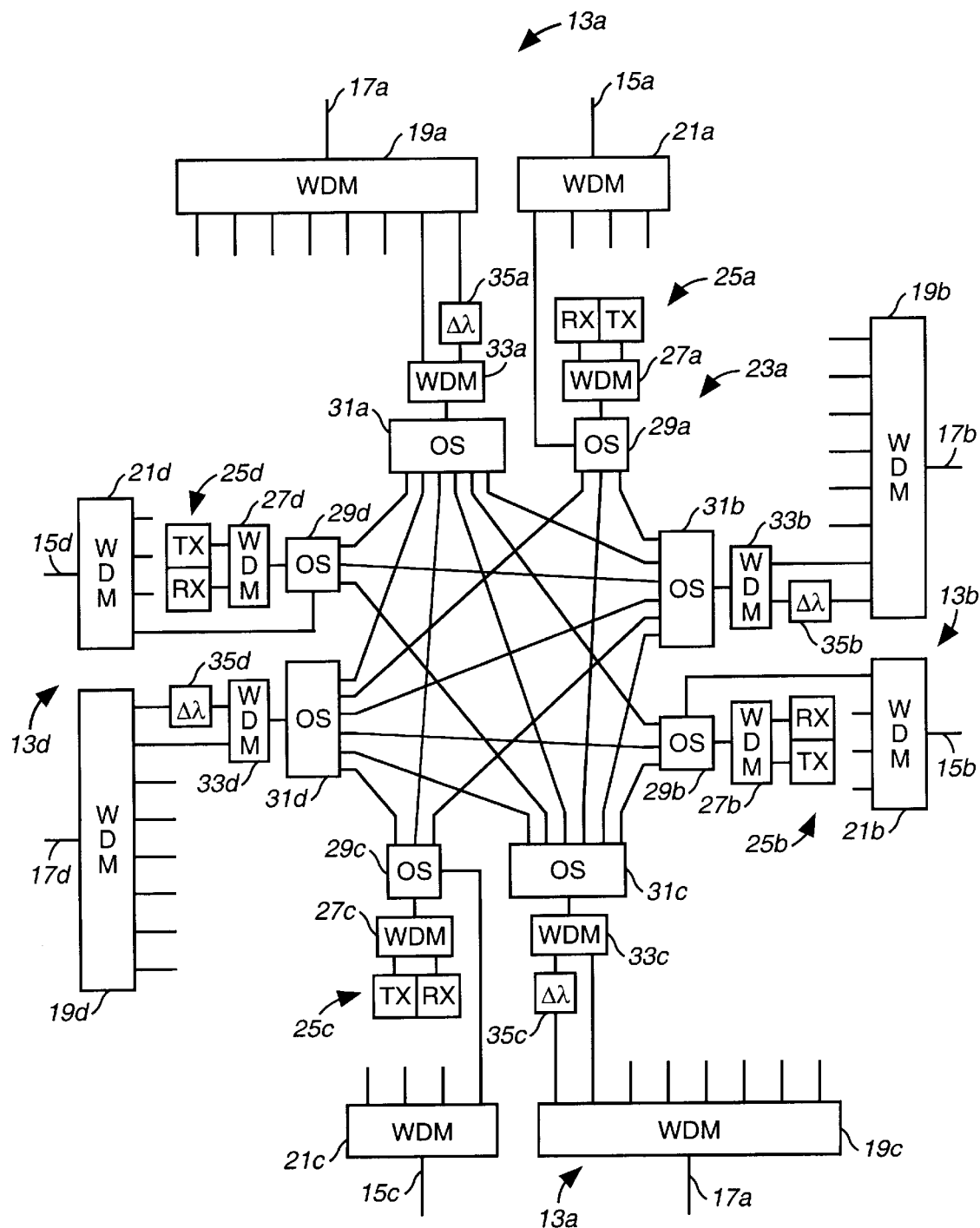
FIG. 3 is a block diagram of a channel layer according to the present invention.

As illustrated in FIGS. 2 and 3, the present invention employs a channel-layered architecture. Node 11 includes a restoration wavelength division multiplexer 19 for each restoration route 17 and a traffic wavelength division multiplexer 21 for each traffic route 15. Each traffic wavelength division multiplexer 21 includes a port for each traffic channel. In the preferred embodiment, a traffic channel comprises a transmit wavelength and a receive wavelength. Thus, each port of traffic wavelength division multiplexer 21 multiplexes two optical wavelengths. Each restoration wavelength division multiplexer 19 includes two ports for each restoration channel. Thus, restoration wavelength division multiplexer 19 includes a transmit wavelength port and a receive wavelength port for each restoration channel. In the embodiment illustrated in FIGS. 2 and 3, there are four channels. However, those skilled in the art will recognize that more or fewer channels can be accommodated according to the present invention.

The node of the present invention includes a layer 23 for each channel. Thus, in the embodiment illustrated in FIGS. 2 and 3, there are four layers. As will be described in detail with respect to FIG. 3, each layer 23 includes light terminal equipment for each traffic channel 15 and means for switching traffic from a traffic route 15 to a restoration route 17 in the event of a traffic route failure. In normal operation, optical signals for each channel originate and terminate at a layer 23. Signals received at node 11 normally travel into node 11 over traffic routes 15. The inbound traffic signals are demultiplexed at a traffic multiplexer 21 into separate receive channels, which are coupled to a layer 23. Similarly, light signals on each channel originating from node 11 are generated in a layer 23 and are multiplexed by traffic wavelength division multiplexer 21 onto traffic route 15. In the event of a failure of a traffic route 15, each layer 23 operates as will be described in detail with respect to FIG. 3 to switch the traffic from the failed traffic route 15 to a restoration wavelength division multiplexer 19, which in turn multiplexes the optical signals to a restoration route 17.

Referring now to FIG. 3, there are shown details of a layer 23. Each layer 23 includes light terminal equipment (LTE) 25 for each traffic channel 15. Each LTE 25 includes an optical transmitter and an optical receiver. As is known to those skilled in the art, each transmitter receives electrical signals and transmits an optical signal on a particular wavelength. Similarly, each receiver receives optical signals and converts those signals to electrical signals. Each transmitter of each LTE 25 for a particular layer 23 transmits on the same optical wavelength.

Figure 4:
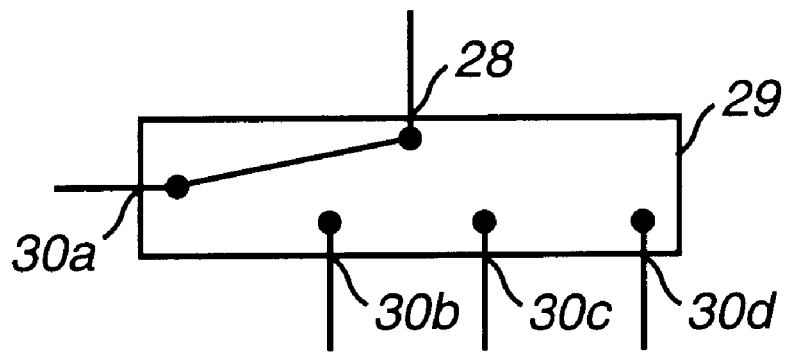
FIG. 4 is a schematic diagram of a one-to-four optical switch.

The output from the transmitter and the input to the receiver of each LTE 25 is coupled to a wavelength division multiplexer 27. The output of each wavelength division multiplexer 27 is coupled to a first port, which is designated by the numeral 28 in FIG. 4, of a traffic optical switch 29. Each traffic optical switch 29 includes a second port for each traffic route 15. Thus, in the embodiment illustrated in FIG. 3 and as shown in more detail in FIG. 4, each optical switch 29 includes four second ports 30a–30d. Generally, each optical switch 29 is a 1-to-N switch, where N is the number of traffic channels. One of the second ports (i.e. port 30a of FIG. 4) of each traffic optical switch 29 is coupled to a traffic wavelength division multiplexer 21. As illustrated in FIG. 4, under normal operations, the first port 28 of a traffic optical switch 29, which is coupled to a wavelength division multiplexer 27, is connected to the second port 30a that is connected to the traffic wavelength division multiplexer 21. Thus, each LTE 25 of a layer 23 is normally coupled to its associated traffic route 15 through a traffic optical switch 29. As shown in FIG. 3, each traffic wavelength division multiplexer 21 has three ports in addition to the one connected to a traffic optical switch 29 of layer 23a. Those three ports are connected to traffic optical switches 29 of layers 23b–23d, which are not shown in FIG. 3.

Figure 5:
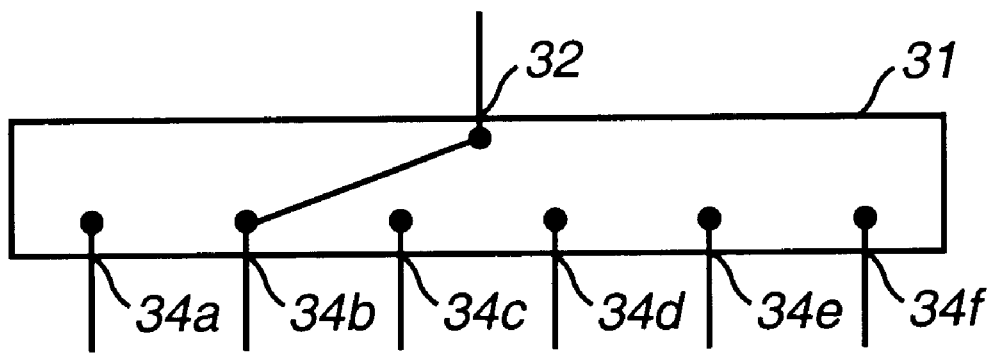
FIG. 5 is a schematic diagram of a one-to-six optical switch.

Each of the remaining second ports (i.e. second ports 30b–30c of FIG. 4) of each optical switch 29 is coupled to a port of a restoration optical switch 31. Each restoration optical switch 31 includes one third port designated by the numeral 32 in FIG. 5, which is connected to a wavelength division multiplexer 33, and a plurality of fourth ports designated by the numerals 34a–34f in FIG. 5, which are connected to the second ports of the traffic optical switches 29 and to other fourth ports of the restoration optical switches 31. In the embodiment illustrated in FIG. 3, each of three fourth ports of restoration optical switch 31a, for example, is connected to a second port of each of traffic optical switches 29b–d. Additionally, each of the remaining three fourth ports of restoration optical switch 31a is connected to a fourth port of each of restoration optical switches 31b–d. In the embodiment of FIG. 3 and as illustrated in FIG. 5, each restoration optical switch 31 includes six fourth ports 34a–34f. Generally, each restoration optical switch 31 includes 2(N−1) fourth ports, where N is the number of traffic routes 15. As illustrated in FIG. 5, third port 32 of an optical restoration switch 31 may be selectively coupled to any one of fourth ports 34a–34f.

The receive input of each wavelength division multiplexer 33 is coupled to a receive port of its associated restoration wavelength division multiplexer 19. The transmit port of each wavelength division multiplexer 33 is coupled to its associated wavelength division multiplexer 19 through a transmit channel converter 35. In certain situations, it is necessary to translate the transmit wavelength for a channel over a restoration route 17. As shown in FIG. 3, each restoration wavelength division multiplexer 19 has six ports in addition to the two coupled to a restoration optical switch 31 of layer 23a. Those six ports are connected to restoration optical switches 31 of layers 23b–23d, which are not shown in FIG. 3.

In operation, each LTE 25 of each layer 23 is normally coupled through its associated traffic optical switch 29 to a traffic wavelength division multiplexer 21. For example, LTE 25a is normally coupled to traffic wavelength division multiplexer 21a. Similarly, LTEs 25b–25d are normally coupled to traffic wavelength division multiplexers 21b–21d, respectively. In the event of a fiber cut in a route 13, the traffic optical switch 29 of the affected route switches to one of the second ports that is connected to a fourth port of a restoration optical switch 31, selected according to restoration policies for the network. Substantially simultaneously, the selected restoration optical switch 31 switches to the fourth port connected to the switching traffic optical switch 29. For example, if route 13a were cut, traffic optical switch 29a would be operated to connect its first port to the second port connected, for example, to restoration optical switch 31d. Substantially simultaneously, restoration optical switch 31d would be operated to couple the fourth port that is connected to traffic optical switch 29a to its third port, which would restore traffic route 15a onto restoration route 17d.

From the foregoing, it may be seen that channel layered architecture of the present invention overcomes the shortcomings associated with the all-optical restoration systems of the prior art. As each additional channel is added to the network, an additional layer is added to each network node. The present invention thus provides a modularized approach that accommodates unlimited channel expansion. Additionally, the failure of a component of a layer affects only one layer without disturbing the operation of the other layers.

What is claimed is:

1. An optical telommunications system node for terminating a plurality of optical cable routes, each of said optical cable routes including a traffic route and a restoration route, said node comprising:

a plurality of traffic wavelength division multiplexers, wherein a traffic wavelength division multiplexer is connected to each traffic route;

a plurality of restoration wavelength division multiplexers, wherein a restoration wavelength division multiplexer is connected to each restoration route; and plurality of optical cross connect layers, wherein an optical cross connect layer is connected to each of said traffic wavelength division mutiplexers and each of said restoration wavelength division mutiplexers, wherein each of said optical cross connect layers comprises a plurality of optical switch pairs, each of said optical switch pairs comprising:

a traffic optical switch comprising one first port and a plurality of second ports selectively connectable to said fist port, wherein said first port is optically coupled to light terminal equipment associated with a traffic route and and one of said second ports is optically coupled to one of said traffic routes; and a restoration optical switch comprising one third port and a plurality of fourth ports selectively connectable to said third port, wherein said third port is optically coupled to a restoration route and each of said fourth ports is optically coupled to a second port of each said traffic optical switches of the other optical switch pairs.

2. The optical telecommunications node as claimed in claim 1, wherein each of a plurality of said fourth ports of each of said restoration optical switches is connected to one of the fourth ports of one of the restoration optical switches of each of the other optical switch pairs.

3. The optical telecommunications node as claimed in claim 1, wherein N cable routes terminate at said node, and each of said optical cross connect layers includes N optical switch pairs, and wherein each of said traffic optical switches includes N second ports and each of said restoration optical switches includes at least (N−1) fourth ports.

4. The optical telecommunications node as claimed in claim 3, wherein each of said restoration optical switches of each of said optical cross connect layers includes at least 2(N−1) fourth ports, and each of N−1 of said fourth ports of each of said restoration optical switches is connected to one of said second ports of N−1 of said traffic optical switches, and each of said remaining fourth ports of each of said restoration optical switches is connected to one of said fourth ports of the other restoration optical switches.

5. The optical telecommunications node as claimed in claim 1, wherein said each light terminal equipment for each optical cross connect layer includes an optical transmitter, adapted to transmit signals on a transmit wavelength, and an optical receiver, adapted to receive signals on a receive wavelength different from said transmit wavelength, and said optical transmitter and receiver are coupled to said first port of said traffic optical switch with a wavelength division multiplexer.

6. The optical telecommunications node as claimed in claim 5, wherein each optical transmitter of a given layer transmits on the same transmit wavelength.

7. The optical telecommunications node as claimed in claim 5, wherein the optical transmitters of each layer transmit on a different wavelength.

8. The optical telecommunications node as claimed in claim 7, wherein each said traffic wavelength division multiplexer has a single port for each layer.

9. The optical telecommunications node as claimed in claim 7, wherein each said restoration wavelength division multiplexer has two ports for each layer, and said third port of each said restoration optical switch is coupled to a wavelength division multiplexer adapted to multiplex said transmit wavelength and said receive wavelength, and said wavelength division multiplexer includes a receive port coupled to said restoration wavelength division multiplexer and a transmit port coupled to said restoration wavelength division multiplexer.

10. The optical telecommunications node as claimed in claim 9, wherein said transmit port is coupled to said restoration wavelength division multiplexer through a wavelength converter.

* * * * *